United States Patent Office 3,287,302
Patented Nov. 22, 1966

3,287,302
POLYMERIZATION CATALYST COMPOSITIONS
AND METHOD OF UTILIZING
Herman B. Wagner, Perkasie, Pa., assignor to Tile Council of America, Inc., New York, N.Y., a corporation of New York
No Drawing. Continuation of application Ser. No. 597,098, July 11, 1956. This application Jan. 21, 1963, Ser. No. 252,603
4 Claims. (Cl. 260—28)

This application is a continuation of my copending application U.S. Serial No. 597,098, filed July 11, 1956.

The present invention relates to improved catalyst compositions particularly useful in certain synthetic resin polymerization reactions and to improved methods of utilizing synthetic resin catalysts that normally cause very rapid polymerization, such that the reaction is under better control.

It has previously been known that certain catalysts cause the polymerization of particular synthetic resins at a very rapid rate, the rate of polymerization often being so rapid that it is almost impossible to completely incorporate the catalyst in the resin by simple mixing before the reaction takes place. Reaction may be so rapid that it is also difficult, if not impossible, to place the polymerizing resin in some desired location or make use of it in some desired manner that requires pouring or spreading since the material becomes solidified too soon. Furthermore, some of these polymerization reactions are highly exothermic to the extent that decomposition of the resin system tends to occur, sometimes with explosive violence.

In many instances it would be desirable to make use of the catalysts that bring about the too-rapid polymerization if the polymerization rate could be retarded sufficiently to overcome the above recited objections.

One object of the present invention is to provide improved catalyst compositions useful in certain rapid polymerization reactions.

Another object is to provide an improved method of utilizing a catalyst which normally causes too-rapid polymerization to occur.

In achieving the above stated objects, the present invention includes as a feature thereof an improved method of utilizing catalysts that normally cause a polymerizable system to polymerize at an undesirable rapid rate, such that the reaction is slowed down and under better control. The catalyst, if a liquid, is absorbed within a substance which is inert both with respect to the catalyst and to the substance which is to be polymerized. The inert substance is of a porous nature and is in particulate form. By "porous" is meant any structure which includes voids capable of absorbing a liquid whether the voids are spherical, columnar, or flat as in a laminated body. The particles, which are impregnated with the catalyst, are coated with an easily meltable material through which the catalyst can diffuse very slowly and which melts and releases more catalyst when the temperature of the system rises high enough to exceed the melting temperature of the coating material.

An example of a system in which the improved compositions and methods of the present invention can be used to great advantage is the epoxy resins. These resins may be described generally as condensation products of poly-arylepoxy compounds and derivatives of such polymers. Examples of manufacture of these resins are found in U.S. Patents 2,324,483 and 2,444,333 to Castan. Any of the epoxy resins may be polymerized by the processes of the present invention.

Although polymerization of the epoxy resins is usually brought about by using catalysts which cause substantially complete polymerization in anywhere from about 15 minutes to several hours, there are certain catalysts which are capable of causing practically instantaneous polymerization. Since the reaction is an exothermic one, a great deal of heat is liberated in a short interval of time and the temperature of the system may rise so high that decomposition of the resin occurs. There is also the danger of explosion and, even though this undesirable result is avoided, the reaction is still so rapid that the properties of the polymer are seriously impaired. On the other hand, the use of the previously utilized slower acting catalysts requires time delays which are undesirably long in many applications.

Examples of catalysts of the rapid acting type for epoxy resins are: halides, i.e., boron tri-fluoride, -iodide, -bromide, or, -chloride. Using the improved compositions and methods of the present invention, it has been found possible to slow down the polymerization reaction sufficiently such that the reaction, instead of being substantially instantaneous, as it would normally be if the catalyst and resin were merely mixed together without taking any special precautions, can be made to take place over a time interval from about one minute to several minutes thus giving sufficient time to pour the resin-catalyst mixture from the mixing vessel to molds, to spread it as a coating, or to use it in other ways such as for bonding tile.

The rapid-acting catalyst, which is preferably in liquid form, is absorbed within a carrier which is in the form of a particulate substance which is both inert and immiscible with respect to the catalyst and the resin which is being polymerized. Using any of the boron halides as the catalyst and the epoxy resins as the system to be polymerized, examples of suitable carrier materials are pumice and infusorial earth. The carrier particles, with the catalyst absorbed in the pores thereof, are then coated with a substance having a relatively low melting temperature. The paraffin hydrocarbon waxes are generally suitable for the coating material. In general, the coating material must not only be easily meltable but must also be inert and immiscible with respect to both the catalyst and the resin.

A quantity of catalyst-impregnated carrier particles containing sufficient catalyst to polymerize a particular quantity of resin is then mixed with the unpolymerized resin and the mixture is transferred to an appropriate mold, form, or other site where it is desired to have the polymerization take place. Following this, the temperature of the system is raised sufficiently to exceed the melting temperature of the coating material. Transition of the coating substance from the solid to the liquid state unseals the carrier pores, allowing outward diffusion of the catalyst and mixing thereof with the substance to be polymerized. If the polymerization reaction is sufficiently exothermic, as is usually the case with the epoxy resins, enough of the catalyst may diffuse through the meltable coating, before it is melted, to cause a slow rise in temperature such that the melting temperature of the coating material is soon reached without the application of external heat. In other cases, external heat may have to be applied.

Instead of directly mixing the catalyst-impregnated carrier particles with the substance to be polymerized, the particles may first be dispersed in some form of diluent, such as another resin, which is compatible with the polymerized substance. The diluent should not be reactive with the catalyst and it may take any one of several forms, such as a plasticiser or other resin modifier.

*Example 1*

5 grams of boron trifluoride-ethyl ether (45% $BF_3$) were mixed together with 20.5 grams of dry powdered pumice (particle size: 50% on, 50% through 200 mesh). To this was added a solution of 2 grams of eicosane (melting point: 35.5 to 37.5 degrees centigrade) in 10 grams of hexane. After thorough mixing of the pumice particles with the solution, the thick slurry was poured onto a flat glass tray and the hexane allowed to evaporate, leaving behind the eicosane-coated pumice particles. With a 1/16" layer of slurry about 15 to 20 minutes at room temperature sufficed for evaporation of the hexane to the atmosphere. The total weight of now dry particles recovered was 26.8 grams, compared to a calculated weight of 27.5 grams.

One gram of these catalyst-containing particles was then dispersed by thorough stirring in four grams of a saturated polyester resin (Thiokol Chem. Corp. ZL–207, for example) toward which the boron trifluoride catalyst is inert. This dispersion was added to six grams of a liquid epoxide-type resin (Shell Chemical Co. Epon Resin 828) and stirred vigorously for twenty seconds. Epon 828 is a condensation product of bisphenol A and epichlorohydrin. The liquid composition was then quickly poured into a small mold and hardened within 90 seconds time, measured from the initial combination of the two liquid portions. A thermometer placed in a similar mixture showed a slow temperature rise from 25 degrees centigrade initially, to a temperature of 37 degrees centigrade one minute after mixing. A sudden rise to a temperature of 115 degrees centigrade then occurred, the mix being observed to rapidly solidify at this point.

*Example 2*

A procedure similar to that described in Example 1 was followed with the following changes: 15 grams of pumice were used rather than the 20 grams noted in Example 1; in place of the eicosane there were used four grams of a paraffin wax with melting point in the range 50 to 55 degrees centigrade. 23.2 grams of dry catalyst particles were obtained, compared to a calculated 24.0 grams.

0.8 gram of this material was dispersed by vigorous stirring in one gram of saturated polyester (ZL–207) and then fifteen additional grams of the polyester added. This slurry was then added to eighteen grams of the epoxy resin and stirred rapidly. A slow temperature rise from 24 degrees centigrade to 52 degrees centigrade occurred over a period of two minutes, followed by a very rapid temperature rise to 110 degrees centigrade as solidification occurred.

*Example 3*

The same liquid compositions described above were cooled to 10 degrees centigrade before combining. After mixing the two liquids, approximately three minutes were required for the mixture to solidify, thus providing an extended working time.

*Example 4*

Four grams of the catalyst particles were dispersed as above in the polyester resin (50 grams). To this slurry were added 6 grams of a 50/50 titanium dioxide pigment, polyester resin dispersion. This slurry was then added to a solution of four grams of xylene in 80 grams of the epoxide resin, the xylene addition being made to obtain a reduced viscosity for easier pouring. The mixture was then poured rapidly into the joints (1/8" spaces) in a square array of ceramic wall tile. Solidification occurred within two minutes, yielding a hard, strong bond between the tiles.

Besides the paraffin waxes, many other types of easily meltable material may be used as the coating for the particulate carrier. Examples are fatty acids, fats, greases, natural resins, certain synthetic resins capable of forming polymeric films, such as polyethylene and polyvinyl chloride, and even low-melting temperature metallic compositions such as Wood's metal. For most uses it is preferred that the coating material have a melting temperature from about 20 degrees centigrade to about 80 degrees centigrade. It must, of course, not be soluble in the catalyst.

The invention is also useful with resin systems other than the epoxy type. Other resins, such as the alkyds, which are also capable of very rapid polymerization with the evolution of heat, in the presence of catalysts, can be utilized.

Having thus described the invention, what is claimed is:

1. A method of polymerizing an epoxy type resin in the presence of a boron halide catalyst which normally causes the polymerization to occur almost instantaneously, said method comprising, absorbing the catalyst in liquid form, within a porous, particulate, inert substance; coating the particles of said inert substance with a paraffin wax, mixing the coated particles with said epoxy resin which is in liquid, unpolymerized form; and permitting the polymerization reaction to occur with evolution of heat at a retarded rate as the catalyst is slowly released from said particles.

2. A method according to claim 1 in which said inert substance is powdered pumice.

3. A method according to claim 2 in which said wax is eicosane.

4. A method according to claim 1 in which the wax-coated particles are first dispersed in a saturated polyester resin before mixing with said epoxy resin.

References Cited by the Examiner

UNITED STATES PATENTS

| 2,326,984 | 8/1943 | Tomlin | 260—793 |
| 2,343,835 | 3/1944 | Smith et al. | 260—752 |
| 2,406,869 | 9/1946 | Upham | 252—433 |
| 2,528,932 | 11/1950 | Wiles et al. | |
| 2,653,925 | 9/1953 | Olin | 260—79.5 |

FOREIGN PATENTS 583,471   12/1946   Great Britain.

MORRIS LIEBMAN, *Primary Examiner.*

B. A. AMERNICK, *Assistant Examiner.*